United States Patent
Liu et al.

(10) Patent No.: US 9,506,741 B2
(45) Date of Patent: Nov. 29, 2016

(54) OPTICAL COHERENCE TOMOGRAPHY SYSTEMS AND METHODS WITH MAGNITUDE AND DIRECTION TRACKING OF TRANSVERSE MOTION

(71) Applicant: The Johns Hopkins University, Baltimore, MD (US)

(72) Inventors: Xuan Liu, Berkeley Heights, NJ (US); Jin U. Kang, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/299,968

(22) Filed: Jun. 9, 2014

(65) Prior Publication Data

US 2015/0354939 A1 Dec. 10, 2015

(51) Int. Cl.
*G01B 9/02* (2006.01)

(52) U.S. Cl.
CPC ......... *G01B 9/02091* (2013.01); *G01B 9/0203* (2013.01)

(58) Field of Classification Search
CPC ............ G01B 9/0203; G01B 9/02091; G01B 9/02089; G01B 9/02044; G01B 9/02084
USPC .................................................. 356/479, 497
See application file for complete search history.

(56) References Cited

U.S. PATENT DOCUMENTS

| | | |
|---|---|---|
| 6,719,700 B1 | 4/2004 | Willis |
| 2010/0110414 A1* | 5/2010 | Colice ................ A61B 5/0062 356/28.5 |

FOREIGN PATENT DOCUMENTS

| | | |
|---|---|---|
| EP | 1312310 A2 | 5/2003 |
| WO | WO-02/03852 A2 | 1/2002 |

(Continued)

OTHER PUBLICATIONS

Luo et al. "Three-dimensional optical coherence tomography of the embryonic murine cardiovascular system", Journal of Biomedical Optics 11(2), 021014, Mar./Apr. 2006.*

(Continued)

*Primary Examiner* — Kara E Geisel
*Assistant Examiner* — Dominic J Bologna
(74) *Attorney, Agent, or Firm* — Venable LLP; Henry J. Daley; Laura G. Remus (57) ABSTRACT

An optical coherence tomography (OCT) system having magnitude and direction of motion detection has a light source, and a scanning system arranged in an optical path of the light source. The scanning system is configured to scan an illumination beam of light in a spatial pattern around each of a plurality of points of interest of an object under observation for a corresponding plurality of instants of time in which each of the plurality of points of interest are displaced from each other due to motion of at least one of the OCT system or the object under observation. The OCT system also includes an OCT detection system configured and arranged to receive at least a portion of the illumination beam of light after being at least one of reflected or scattered from said the under observation, and a signal processor configured to communicate with the OCT detection system to receive detection signals therefrom. The signal processor is configured to process the detection signals to determine both magnitude and direction of relative motion of the OCT system from a first one of the plurality of points at a first corresponding time to a second one of the plurality of points at a second corresponding time.

18 Claims, 6 Drawing Sheets

(56) References Cited

FOREIGN PATENT DOCUMENTS

| WO | WO-03/022156 A1 | 3/2003 |
| WO | WO-2004/021044 A1 | 3/2004 |
| WO | WO-2006/077107 A1 | 7/2006 |
| WO | WO-2010/020939 A2 | 2/2010 |
| WO | WO-2011/139895 A1 | 11/2011 |

OTHER PUBLICATIONS

Huang et al. "Optical Coherence Tomography", Science Nov. 22, 1991; 254(5035): 1178-1181.*

Li Huo et al. "Forward-viewing resonant fiber-optic scanning endoscope of appropriate scanning speed for 3D OCT imaging" Jul. 5, 2010 / vol. 18, No. 14 / Optics Express 14375.*

Chen et al., "Noninvasive imaging of in viv blood flow velocity using optical Doppler tomography," Opt. Lett. 22 (14), 1119-1121 (1997).

Hammer et al., "Advanced Scanning Methods with Tracking OCT," Opt. Express 13 (20) 7937-7947 (2005).

Jia et al., "Split-spectrum amplitude-decorrelation angiography with optical coherence tomography," Opt. Lett. 20 (4), 4710-4725 (2012).

Liu et al., "Distortion-free freehand-scanning OCT implemented with real-time scanning speed variance correction," Opt. Express 20, 16567-16583 (2012).

Liu et al., "Quantitative transverse flow measurement using OCT speckle decorrelation analysis," Opt. Lett. 38, 805-807 (2013).

Liu et al., "Real-time bulk-motion-correction free Doppler variance optical coherence tomography for choroidal capillary vasculature imaging," Opt. Express 19, 3657-3666 (2011).

Singh et al., "Stable absolute flow estimation Doppler OCT based on virtual circumpapillary scans," Biomed Opt. Express 1 (4), 1047-1058, (2010).

Wang et al., "Measurement of total blood flow in the normal human retina using Doppler Fourier-domain OCT," British Journal of Ophthalmology 93 (5), 637-637 (2009).

Wehbe et al., "Automatic Retinal Blood Vessel Parameter Calculation in Spectral Domain OCT," Progress in Biomedical Optics and Imaging 15 (23) 15193-15206 (2007).

International Search Report issued in PCT Application No. PCT/US2013/050757 dated Nov. 22, 2013.

Huang et al., "Real-time 3D and 4D Fourier domain Doppler optical coherence tomography based on dual graphics processing units," Biomed. Opt. Express 3, 2162-2174 (2012).

* cited by examiner

OPTICAL COHERENCE TOMOGRAPHY SYSTEMS AND METHODS WITH MAGNITUDE AND DIRECTION TRACKING OF TRANSVERSE MOTION

FEDERAL FUNDING

This invention was made with U.S. Government support of Grant Nos. 1R01 EB 007969-01 and R011R01EY021540-01A1, awarded by the Department of Health and Human Services, NIH. The U.S. Government has certain rights in this invention.

BACKGROUND

1. Field of Invention

The field of the currently claimed embodiments of this invention relates to optical coherence tomography (OCT) systems and methods of use, and more particularly to OCT systems and methods that include tracking of both magnitude and direction of transverse motion.

2. Discussion of Related Art

In optical coherence tomography (OCT), motion tracking is critical for the development of free-hand OCT systems that require correction of motion artifacts to improve image quality and for flow measurements for micro-circulation studies. Optical Doppler tomography (ODT) has been widely used in flow measurement and motion tracking in the axial direction (Z. P. Chen, T. E. Milner, S. Srinivas, X. Wang, A. Malekafzali, M. J. C. van Gemert, and J. S. Nelson, "Noninvasive imaging of in vivo blood flow velocity using optical Doppler tomography," Opt. Lett. 22(14), 1119-1121 (1997); G. Liu, W. Qi, L. Yu, and Z. Chen, "Real-time bulk-motion-correction free Doppler variance optical coherence tomography for choroidal capillary vasculature imaging," Opt. Express 19, 3657-3666 (2011)). We have also developed methods for transverse flow measurement and transverse motion tracking based on speckle decorrelation analysis (X. Liu, Y. Huang, and J. U. Kang, "Distortion-free freehand-scanning OCT implemented with real-time scanning speed variance correction," Opt. Express 20, 16567-16583 (2012); X. Liu, Y. Huang, J. C. Ramella-Roman, S. Mathews, and J. U. Kang, "Quantitative transverse flow measurement using OCT speckle decorrelation analysis," Opt. Lett. 38, 805-807 (2013)). However, our speckle decorrelation method only extracts the speed, not the direction of the motion. Therefore, there remains a need for improved OCT systems and methods that can provide both magnitude and direction of motion of the OCT system relative to an object under observation.

SUMMARY

An optical coherence tomography (OCT) system having magnitude and direction of motion detection according to an embodiment of the current invention has a light source, and a scanning system arranged in an optical path of the light source. The scanning system is configured to scan an illumination beam of light in a spatial pattern around each of a plurality of points of interest of an object under observation for a corresponding plurality of instants of time in which each of the plurality of points of interest are displaced from each other due to motion of at least one of the OCT system or the object under observation. The OCT system also includes an OCT detection system configured and arranged to receive at least a portion of the illumination beam of light after being at least one of reflected or scattered from said the under observation, and a signal processor configured to communicate with the OCT detection system to receive detection signals therefrom. The signal processor is configured to process the detection signals to determine both magnitude and direction of relative motion of the OCT system from a first one of the plurality of points at a first corresponding time to a second one of the plurality of points at a second corresponding time.

A method of detecting magnitude and direction of motion of an object under observation using an optical coherence tomography (OCT) system according to an embodiment of the current invention includes scanning the object under observation with an illumination beam of light from a light source of the OCT system in a spatial pattern around each of a plurality of points of interest of the object under observation for a corresponding plurality of instants of time in which each of the plurality of points of interest are displaced from each other due to motion of at least one of said OCT system or the object under observation; detecting with the OCT system at least a portion of the illumination beam of light after being at least one of reflected or scattered from the object under observation to provide detection signals; and processing the detection signals using a signal processor to determine both magnitude and direction of relative motion of the OCT system from a first one of the plurality of points at a first corresponding time to a second one of the plurality of points at a second corresponding time.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification are incorporated by reference as if each had been individually incorporated.

Some embodiments of the current invention provide a transverse motion tracking method which can determine both speed and direction of the motion. This method involves scanning the OCT beam circularly and processing the obtained three dimensional data with novel methods. A 2D OCT dataset (Pseudo Bscan, abbreviated as pBscan) is obtained when the beam performs one circle of scanning Sequentially acquired pBscans form a 3D data set (Pseudo Cscan, abbreviated as pCscan). We further averaged pCscan in the axial dimension to form a 2D image that has striped patterns as features related to motion. Due to the motion, different Ascans in pBscan sample the same point in the transverse plane; therefore the oblique stripes are observed. The obliquity of the striped patterns depends on the speed of motion and the location of the striped patterns depends on the direction of motion. We were able to extract parameters that are linearly related to the speed and the direction of motion with novel image analyzing methods.

The term "Ascan" refers to the one-dimensional OCT scan in the axial direction.

Figure 1:
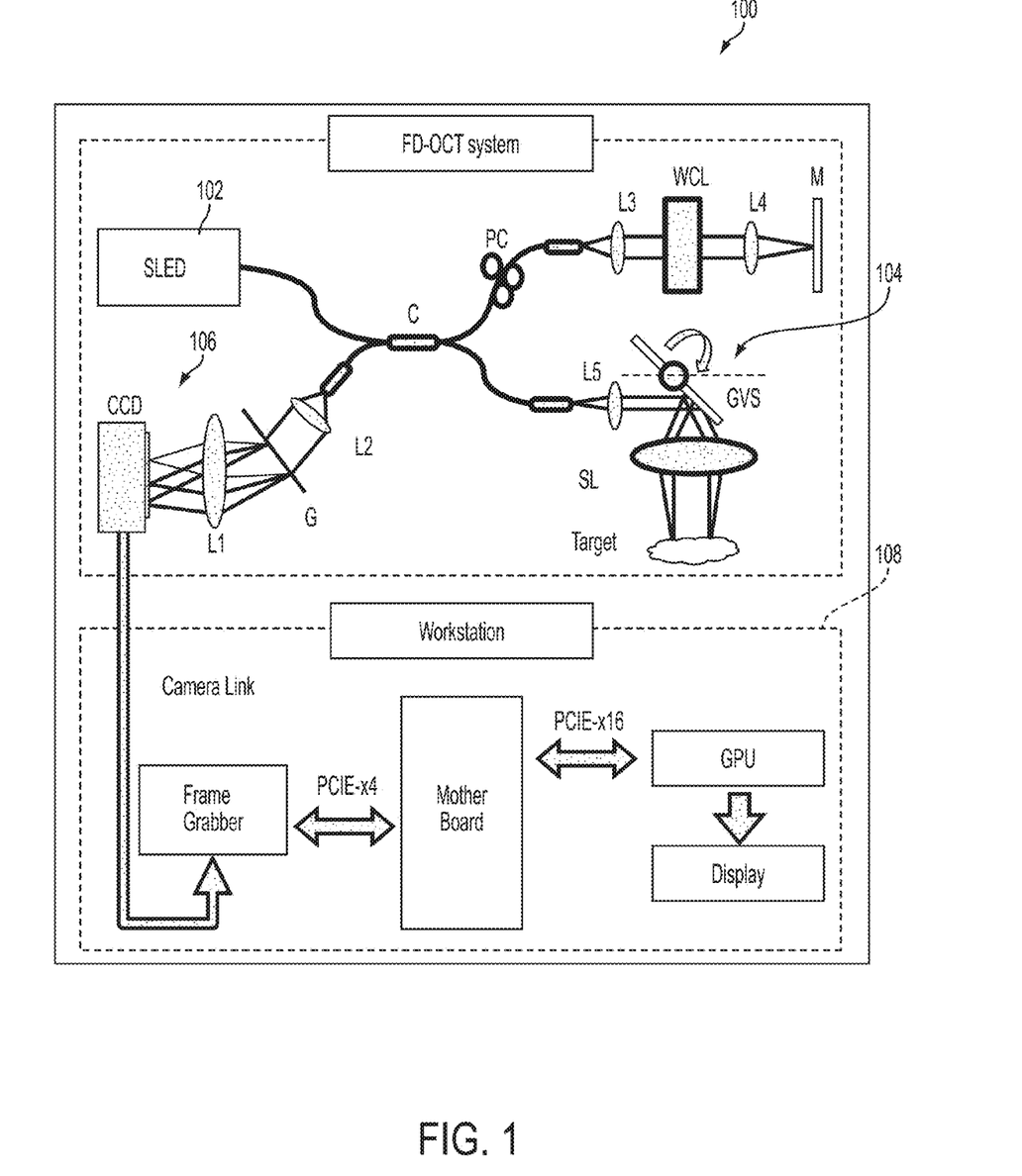
FIG. 1 is a schematic illustration of an optical coherence tomography (OCT) system having magnitude and direction of motion detection according to an embodiment of the current invention.

FIG. 1 provides a schematic illustration of an optical coherence tomography (OCT) system 100 having magnitude and direction of motion detection according to an embodiment of the current invention. The OCT system 100 includes a light source 102 and a scanning system 104 arranged in an optical path of the light source 102. The scanning system 104 is configured to scan an illumination beam of light in a spatial pattern around each of a plurality of points of interest of an object under observation for a corresponding plurality of instants of time in which each of the plurality of points of interest are displaced from each other due to motion of at least one of the OCT system 100 or the object under observation. (Also see FIGS. 2A and 2B.) The OCT system 100 also includes an OCT detection system 106 configured and arranged to receive at least a portion of the illumination beam of light after being at least one of reflected or scattered from the object under observation, and a signal processor 108 configured to communicate with the OCT detection system 106 to receive detection signals therefrom. The signal processor 108 is configured to process the detection signals to determine both magnitude and direction of relative motion of the OCT system 100 from a first one of the plurality of points at a first corresponding time to a second one of the plurality of points at a second corresponding time.

The general concepts of the current invention are not limited to the particular layout and components illustrated in FIG. 1, which are shown by way of example. For example, the scanning system 104 can include a pair of galvanometers such as in the example below. However, other scanning systems may be used. The current invention is not limited to the particular type of light sources, scanning systems and OCT detection systems. In addition, the signal processor can be a workstation, or a portion of a work station. It can also be, or can be a portion of, one or more other types of computers or processing chips, for example. The signal processor can be a programmable signal processor in some embodiments of the current invention. However, in other embodiments, the signal processor can be, or can include, hard-wired circuits such as, but not limited to, ASICs and/or an FPGAs.

In FIG. 1, the system configuration is as follows: CCD, CCD line-scan camera; G, grating; L1, L2, L3, L4, L5, achromatic lenses; C, 50:50 broadband fiber coupler; PC, polarization controller; GVS, galvanometer pairs; SL, scanning lens; SP, sample; M, mirror; WCL, water cell.

The spatial pattern can be substantially a circular pattern. Here, "substantially" means that exact circularity is not required. It can be circular to within certain manufacturing tolerances, and/or the desired precision for the particular application.

The signal processor 108 can be further configured to form a pseudo B-scan representation of each cycle of the circular pattern from corresponding A-scan lines along the cycle of the circular pattern. The signal processor 108 can be further configured to form a pseudo C-scan representation from a plurality of pseudo B-scans for corresponding successive pluralities of cycles of the circular pattern. In some embodiments, the signal processor 108 can be further configured to average the pseudo C-scan representation along an axial direction for each A-scan within the pseudo C-scan representation to provide a two-dimensional transverse motion tracking map. In some embodiments, the signal processor 108 can be further configured to identify linear patterns in the two-dimensional transverse motion tracking map in order to determine both magnitude and direction of relative motion of the OCT system. In some embodiments, the signal processor 108 can be further configured to perform a two-dimensional spatial Fourier transform of the two-dimensional transverse motion tracking map in order to determine both magnitude and direction of relative motion of the OCT system. In some embodiments, the signal processor 108 can be further configured to perform a two-dimensional spatial Fourier transform of the two-dimensional transverse motion tracking map to provide a transform map in order to determine both magnitude and direction of relative motion of said OCT system. In some embodiments, the signal processor 108 can be further configured to perform a threshold filtering of the transform map to provide a binary map in order to determine both magnitude and direction of relative motion of the OCT system. In some embodiments, the signal processor 108 can be still further configured to perform a Hough transformation of the binary map to determine linear features in the binary map in order to determine both magnitude and direction of relative motion of the OCT system.

A method of detecting magnitude and direction of motion of an object under observation using an optical coherence tomography (OCT) system according to some embodiments of the current invention includes scanning the object under observation with an illumination beam of light from a light source of the OCT system in a spatial pattern around each of a plurality of points of interest of the object under observation for a corresponding plurality of instants of time in which each of the plurality of points of interest are displaced from each other due to motion of at least one of said OCT system or the object under observation. The method also include detecting with the OCT system at least a portion of the illumination beam of light after being at least one of reflected or scattered from the object under observation to provide detection signals, and processing the detection signals using a signal processor to determine both magnitude and direction of relative motion of the OCT system from a first one of the plurality of points at a first corresponding time to a second one of the plurality of points at a second corresponding time. The method can also include any or all of the above-noted processing functions of the signal processor.

Further concepts and details of various embodiments of the current invention will be explained by way of the following examples. The general concepts of the current invention are not limited to the particular examples.

EXAMPLES

In the following examples according to an embodiment of the current invention, we used a high speed, high resolution OCT system at 840 nm wavelength range (Y. Huang, X. Liu, and J. U. Kang, "Real-time 3D and 4D Fourier domain Doppler optical coherence tomography based on dual graphics processing units," Biomed. Opt. Express 3, 2162-2174 (2012), the entire content of which is hereby incorporated by reference). To obtain circular scanning, we applied two orthogonal sinusoidal functions to a pair of galvanometers. A phantom made with multiple tape layers was attached to a linear piezo motor (Piezo LEGS) that provided different speeds. We attached the piezo motor to a rotation stage to control the direction of sample motion. When the beam finished one circular scanning cycle, Ascans acquired with equal time interval formed a 2D OCT data, pBscan. pCscan was obtained by stacking multiple pBscans obtained sequentially from different cycles of the circular scanning.

To simplify the discussion, we consider the circular scanning pattern is translating and the sample is static, which is physically equivalent to a static circular scanning pattern above a translating sample in the opposite direction. We further assume one pBscan is obtained from a circle on the 2D transverse plane (left circles in FIGS. 2A and 2B) and the subsequent pBscan is obtained from a displaced circle (right circles in FIGS. 2A and 2B). This model allows us to express pCscan as a function of z, $\theta$, and t, where z indicates the axial coordinate; $\theta$ indicates the argument of the complex number representing the circular scanning; t indicates time when a circular scanning starts. We averaged pCscan in axial dimension to obtain $F(\theta, t)$ for transverse motion tracking.

Figures 2A, 2B, 2C:
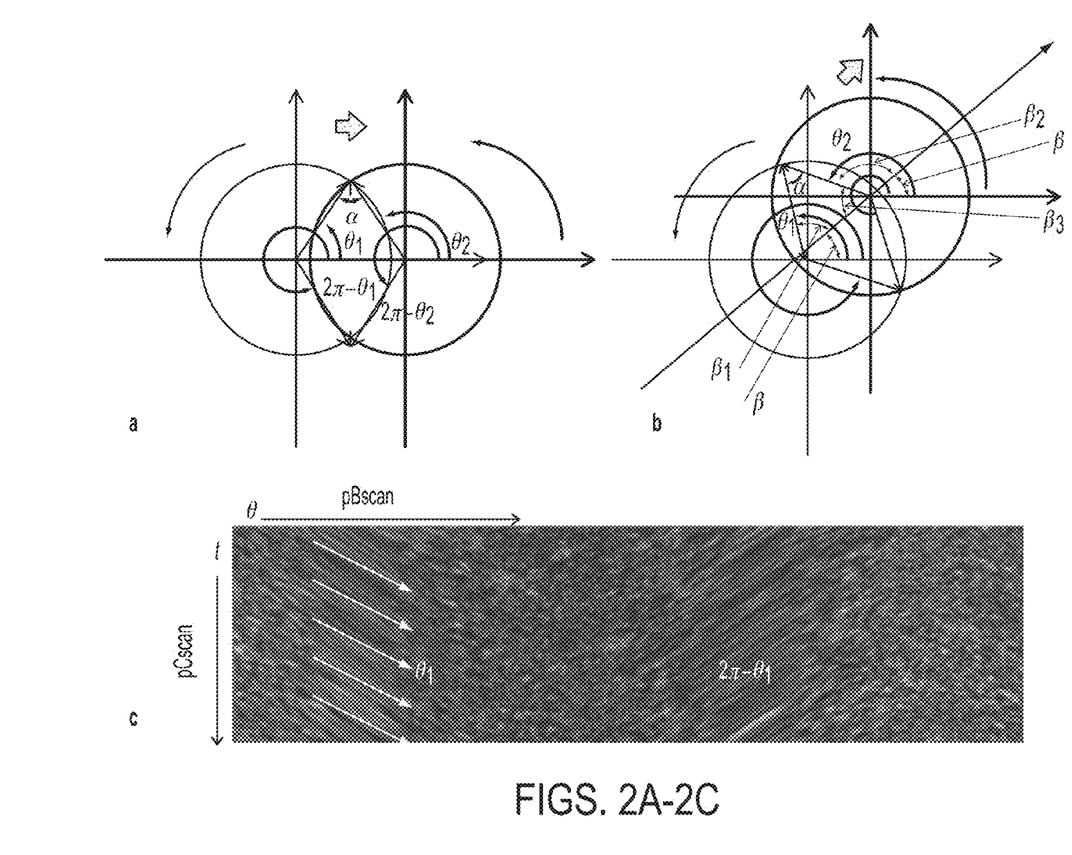
FIGS. 2A-2C show (a) illustration of the principle of motion speed extraction through a circular scan according to an embodiment of the current invention; (b) illustration of the principle of motion direction extraction through a circular scan according to an embodiment of the current invention; (c) representative 2D image $F(\theta,t)$ obtained by averaging pCscan in axial direction according to an embodiment of the current invention.

As shown in FIGS. 2A and 2B, the displacement between the center of the left and right circles is determined by the direction (described by $\beta$) and magnitude of the motion. Denote the speed as v, the time interval between two pBscans as $\Delta T$, and the radius of circular scanning pattern as R. If $vT$ is smaller than R, there exist two intersection points between the left and the right circles: $F(\theta_1, t_0)=F(\theta_2, t_0+\Delta T)$ and $F(2\pi-\theta_1, t_0)=F(2\pi-\theta_2, t_0+\Delta T)$, which implies that pixels corresponding to $(\theta_1, t_0)$ and $(\theta_2, t_0+\Delta T)$ are sampling the same point on the sample and so do pixels corresponding to $(2\pi-\theta_1, t_0)$ and $(2\pi-\theta_2, t_0+\Delta T)$.

Simple geometric analysis leads to Eq (1) and (2).

$$\alpha=\theta_2-\theta_1 \quad (1)$$

$$v=2R\sin(\alpha/2)/\Delta T \quad (2)$$

Therefore, we have $F(\theta_1, t_0)=F(\theta_1+\alpha, t_0+\Delta T)$ and $F(2\pi-\theta_1, t_0)=F(2\pi-\theta_1-\alpha, t_0+\Delta T)$, meaning that pixel values are identical in the line $t=(\theta-\theta_1)\Delta T/\alpha+t_0$ and $t=-(\theta+\theta_1-2\pi)\Delta T/\alpha+t_0$ in 2D image $F(\theta, t)$. Such pixels near $\theta=\theta_1$ and $\theta=2\pi-\theta_1$ form an oblique stripe in $F(\theta, t)$ as shown in FIG. 2C (indicated by arrows) with slopes which equal $\pm\Delta T/\alpha$. As shown in Eq (2), $\alpha$ increase as motion speed v; therefore the striped pattern becomes less steep with a larger speed.

Moreover, $\theta_1$ is determined by where the two circular scanning patterns intersect and its value depends on the direction of motion. As shown in FIG. 2B, with $\theta_1=\beta+\beta_1$; $\theta_2=\beta+\beta_2$; $\beta_1+\beta_2=\beta_1+\beta_1+\beta_3=\pi$, we can express $\theta_1$ as Eq (3). For a given scanning pattern and a given scanning speed that leads to a certain value of a, the value of $\theta_1$ is determined by $\beta$, the angle that describes the direction of motion. In other words, the oblique stripe, feature in image $F(\theta, t)$ that is directly related to motion, appears in different locations in $F(\theta, t)$ with different motion direction.

Results

Figure 3:
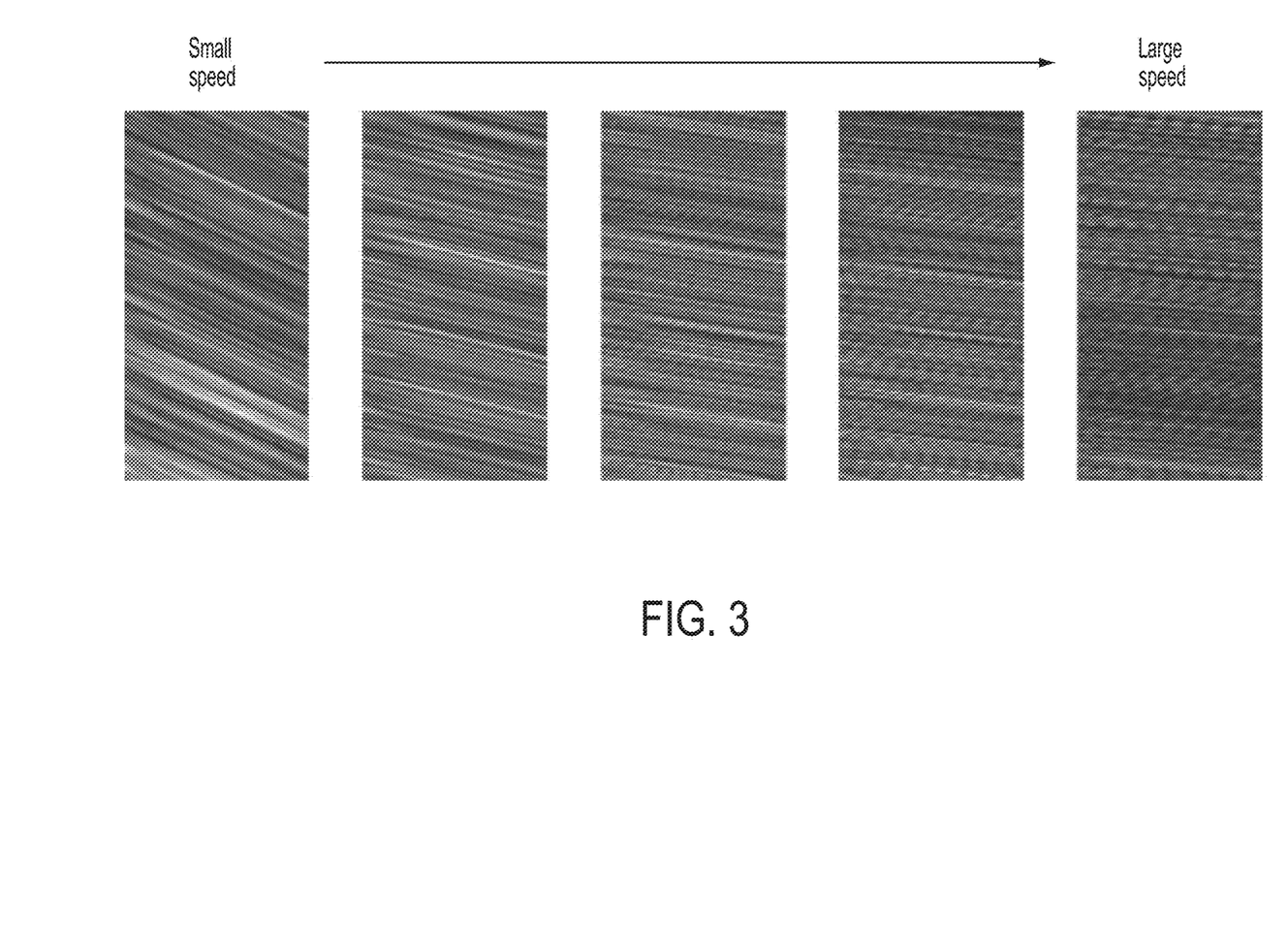
FIG. 3 shows examples of oblique stripe pattern in $F(\theta,t)$ corresponding to different motion speed (from small to large) according to an embodiment of the current invention.
Figure 4A:
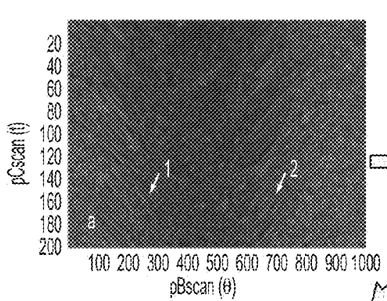
FIGS. 4A-4E show (a) $F(\theta,t)$; (b) $F(\theta,t)$ in frequency domain obtained by 2D FFT; (c) binary image of frequency domain $F(\theta,t)$; (d) Hough transformation matrix; (e) p VS motion speed v according to an embodiment of the current invention.
Figure 4B:
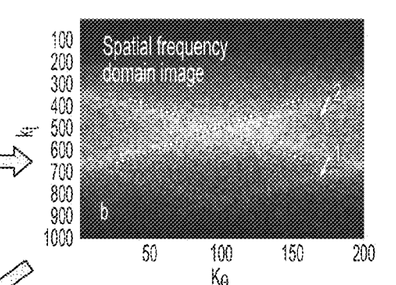
Figure 4C:
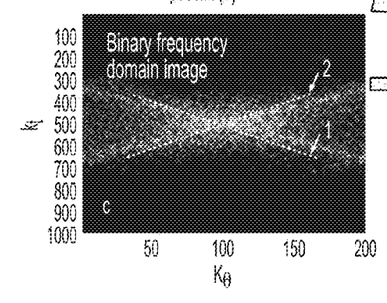
Figure 4D:
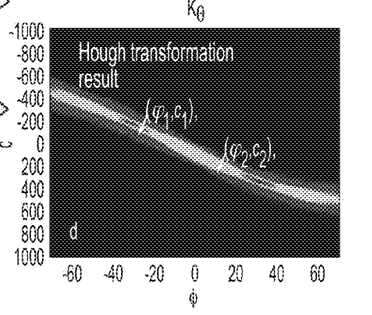

With fixed direction of motion, we varied the speed of the piezo motor from small to large (0.265, 0.5, 0.76, 1.02, 1.285 mm/s) and show corresponding regions with oblique stripe in FIG. 3. It is clear that the slope of the stripe decreases as the speed increases, which is consistent with our previous discussion. To extract speed quantitatively, we applied 2D FFT on $F(\theta,t)$ as shown in FIG. 4A to obtain FIG. 4B. The striped patterns (indicated by the first and second arrow in FIG. 4A) correspond to two bright lines in FIG. 4B (indicated by the dashed red lines, $k_t=\lambda_{1,2}k_\theta+c$). We turned the frequency domain image in FIG. 4B to a binary image in FIG. 4C by thresholding and performed Hough transformation to detect the two lines in frequency domain which corresponds to the striped pattern in FIG. 4A. Two points $(\phi_1, c_1)$, and $(\phi_2, c_2)$ with maximum values in the Hough matrix as indicated by arrows in FIG. 4D is related to lines in FIGS. 4B and 4C with $\lambda_1=\tan(\phi_1)$ and $\lambda_2=\tan(\phi_2)$. Moreover, $\phi_1=-\phi_2$ and $\alpha=abs(\lambda_{1,2})$. Using Eq (2), we can obtain Eq (4) in which (4) $\mu=2R/\Delta T$ and $p=\sin[(\tan\phi_1)/2]$. Eq (4) shows that motion speed is linearly related to p extracted by analyzing OCT image $F(\theta,t)$, as $\mu$ only depends on the parameters of the circular scanning.

$$v=\mu p \quad (4)$$

Figure 4E:
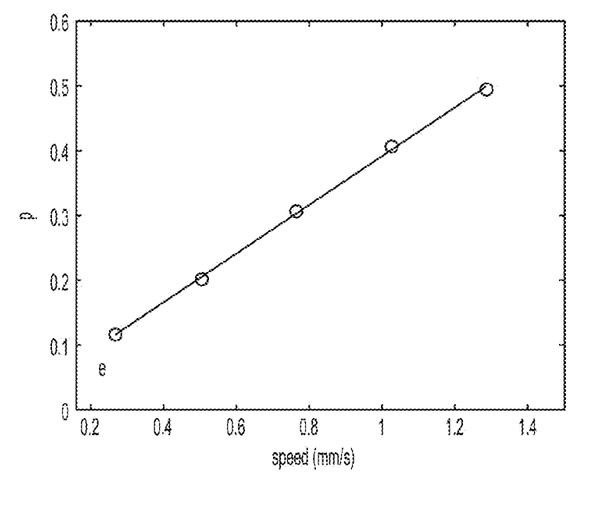

From OCT data obtained with different speeds of motion, we extracted different values of p. p VS scanning speed is shown in FIG. 4E as circles. We also show linear fitting of p on v as the curve in FIG. 4E. Regression of linear model $v=\mu p$ gives a $R^2$ statistics of 0.9983, indicating the linear model is highly reliable.

Figure 5:
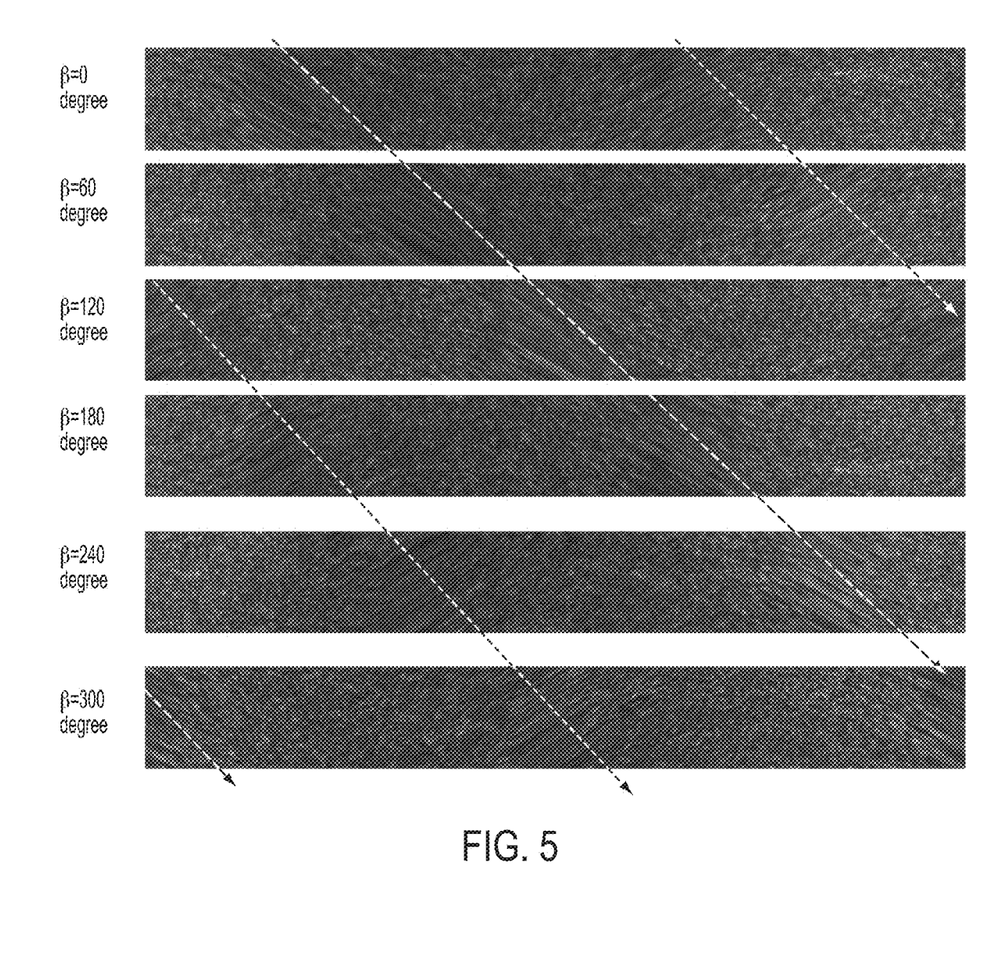
FIG. 5 shows $F(\theta,t)$ obtained with different motion direction according to an embodiment of the current invention.
Figure 6A:
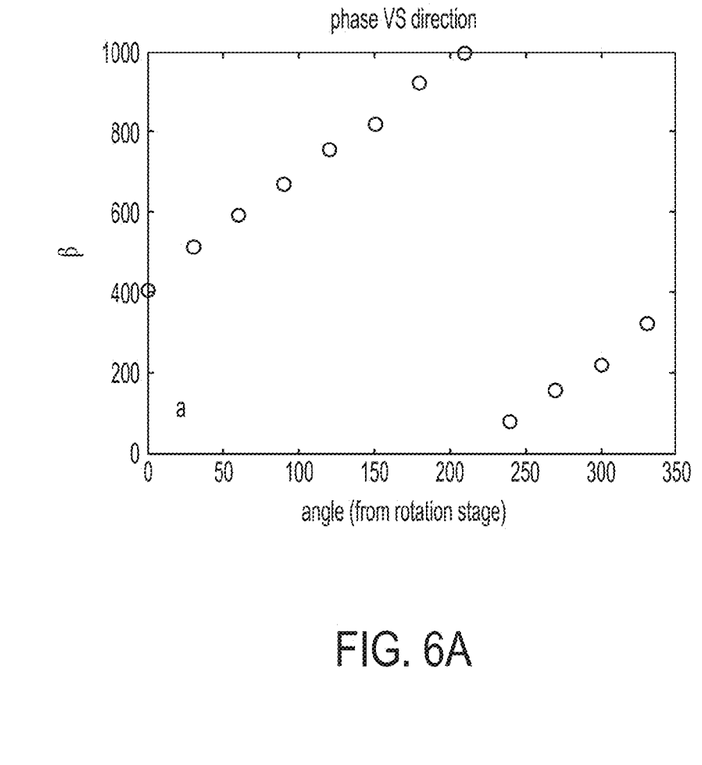
FIGS. 6A and 6B show (a) β extracted from $F(\theta, t)$ VS the direction of motion controlled by the rotation stage; (b) β extracted from $F(\theta, t)$, with phase unwrapping, VS the direction of motion controlled by the rotation stage according to an embodiment of the current invention.
Figure 6B:
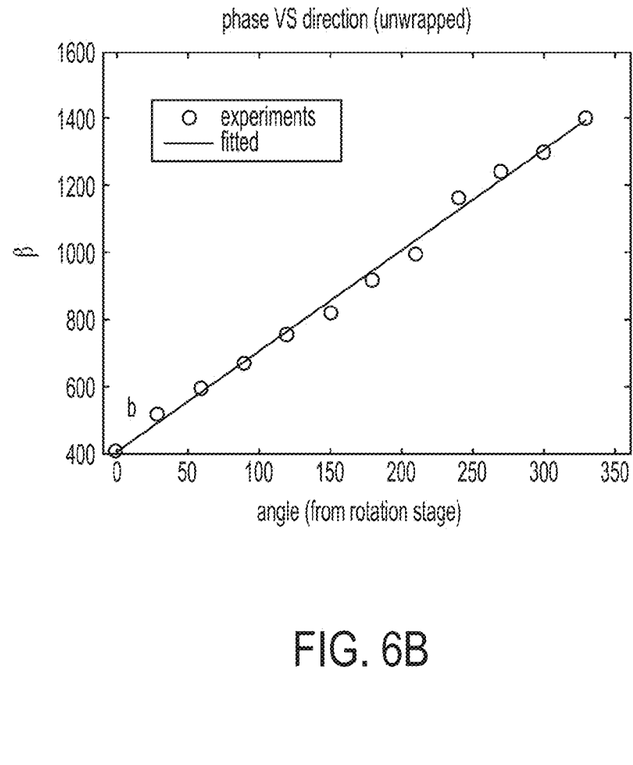

We also changed the direction of motion using the rotation stage. While maintaining the motion speed constant, we obtained OCT data at different motion directions. Images of $F(\theta, t)$ obtained at different direction are shown in FIG. 5. The location of striped pattern varies as the direction of motion, as indicated by the dashed arrows in FIG. 5. To localize the striped pattern and extract direction of motion, we performed Fourier transformation on $F(\theta,t)$ along t dimension, extracted the phase, unwrapped the phase along $\theta$ dimension, averaged the phase along t dimension, detected $\theta$ that corresponds to the maximum value of the averaged phase to represent the location of striped pattern in $F(\theta,t)$. Results are shown in FIG. 6A. The unit for both vertical and horizontal axis in FIGS. 6A and 6B is degree. Phase discontinuity in FIG. 6A is due to extracting the phase of a complex number $X+jY$ by taking a $\tan(Y/X)$. Performing phase unwrapping on results shown in FIG. 6A leads to FIG. 6B, as circles. In comparison, we also show the result of linear fitting as the line in FIG. 6B, indicating that we were able to resolve the direction of motion.

CONCLUSION

In this example, we demonstrated a method for quantitative transverse motion tracking using a circularly scanned OCT beam according to an embodiment of the current invention. Results show that we can resolve both speed and direction of transverse motion.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. An optical coherence tomography (OCT) system having magnitude and direction of motion detection, comprising:
   a light source;
   a scanning system arranged in an optical path of said light source, said scanning system being configured to scan an illumination beam of light in a two-dimensional (2-D) spatial pattern around each of a plurality of points of interest of an object under observation for a corresponding plurality of instants of time in which each of the plurality of points of interest are displaced from each other due to motion of at least one of said OCT system or said object under observation;
   an OCT detection system configured and arranged to receive at least a portion of said illumination beam of light after being at least one of reflected or scattered from said object under observation; and
   a signal processor configured to communicate with said OCT detection system to receive detection signals therefrom,
   wherein said signal processor is configured to process said detection signals to determine both magnitude and direction of relative motion of said OCT system from a first one of said plurality of points at a first corresponding time to a second one of said plurality of points at a second corresponding time, and
   wherein said 2-D spatial pattern is substantially a circular pattern that is centered on one of said plurality of points of interest for each of said corresponding plurality of instants of time.

2. The OCT system according to claim 1, wherein said signal processor is further configured to form a pseudo B-scan representation of each cycle of said circular pattern from corresponding A-scan lines along said cycle of said circular pattern.

3. The OCT system according to claim 2, wherein said signal processor is further configured to form a pseudo C-scan representation from a plurality of pseudo B-scans for corresponding successive pluralities of cycles of said circular pattern.

4. An optical coherence tomography (OCT) system having magnitude and direction of motion detection, comprising:
   a light source;
   a scanning system arranged in an optical path of said light source, said scanning system being configured to scan an illumination beam of light in a spatial pattern around each of a plurality of points of interest of an object under observation for a corresponding plurality of instants of time in which each of the plurality of points of interest are displaced from each other due to motion of at least one of said OCT system or said object under observation;
   an OCT detection system configured and arranged to receive at least a portion of said illumination beam of light after being at least one of reflected or scattered from said object under observation; and
   a signal processor configured to communicate with said OCT detection system to receive detection signals therefrom,
   wherein said signal processor is configured to process said detection signals to determine both magnitude and direction of relative motion of said OCT system from a first one of said plurality of points at a first corresponding time to a second one of said plurality of points at a second corresponding time,
   wherein said spatial pattern is substantially a circular pattern,
   wherein said signal processor is further configured to form a pseudo B-scan representation of each cycle of said circular pattern from corresponding A-scan lines along said cycle of said circular pattern,
   wherein said signal processor is further configured to form a pseudo C-scan representation from a plurality of pseudo B-scans for corresponding successive pluralities of cycles of said circular pattern, and
   wherein said signal processor is further configured to average said pseudo C-scan representation along an axial direction for each A-scan within said pseudo C-scan representation to provide a two-dimensional transverse motion tracking map.

5. The OCT system according to claim 4, wherein said signal processor is further configured to identify linear patterns in said two-dimensional transverse motion tracking map in order to determine said both magnitude and direction of relative motion of said OCT system.

6. The OCT system according to claim 5, wherein said signal processor is further configured to perform a two-dimensional spatial Fourier transform of said two-dimensional transverse motion tracking map in order to determine said both magnitude and direction of relative motion of said OCT system.

7. The OCT system according to claim 6, wherein said signal processor is further configured to perform a two-dimensional spatial Fourier transform of said two-dimensional transverse motion tracking map to provide a transform map in order to determine said both magnitude and direction of relative motion of said OCT system.

8. The OCT system according to claim 7, wherein said signal processor is further configured to perform a threshold filtering of said transform map to provide a binary map in order to determine said both magnitude and direction of relative motion of said OCT system.

9. The OCT system according to claim 8, wherein said signal processor is further configured to perform a Hough transformation of said binary map to determine linear features in said binary map in order to determine said both magnitude and direction of relative motion of said OCT system.

10. A method of detecting magnitude and direction of motion of an object under observation using an optical coherence tomography (OCT) system, comprising:
    scanning said object under observation with an illumination beam of light from a light source of said OCT system in a two-dimensional (2-D) spatial pattern around each of a plurality of points of interest of said object under observation for a corresponding plurality of instants of time in which each of the plurality of points of interest are displaced from each other due to motion of at least one of said OCT system or said object under observation;
    detecting with said OCT system at least a portion of said illumination beam of light after being at least one of reflected or scattered from said object under observation to provide detection signals; and processing said detection signals using a signal processor to determine both magnitude and direction of relative motion of said OCT system from a first one of said plurality of points at a first corresponding time to a second one of said plurality of points at a second corresponding time, wherein said 2-D spatial pattern is substantially a circular pattern that is centered on one of said plurality of points of interest for each of said corresponding plurality of instants of time.

11. The method of claim 10, wherein said processing further comprises forming a pseudo B-scan representation of each cycle of said circular pattern from corresponding A-scan lines along said cycle of said circular pattern.

12. The method of claim 11, wherein said processing further comprises forming a pseudo C-scan representation from a plurality of pseudo B-scans for corresponding successive pluralities of cycles of said circular pattern.

13. A method of detecting magnitude and direction of motion of an object under observation using an optical coherence tomography (OCT) system, comprising:

scanning said object under observation with an illumination beam of light from a light source of said OCT system in a spatial pattern around each of a plurality of points of interest of said object under observation for a corresponding plurality of instants of time in which each of the plurality of points of interest are displaced from each other due to motion of at least one of said OCT system or said object under observation;

detecting with said OCT system at least a portion of said illumination beam of light after being at least one of reflected or scattered from said object under observation to provide detection signals; and processing said detection signals using a signal processor to determine both magnitude and direction of relative motion of said OCT system from a first one of said plurality of points at a first corresponding time to a second one of said plurality of points at a second corresponding time, wherein said spatial pattern is substantially a circular pattern, wherein said processing further comprises forming a pseudo B-scan representation of each cycle of said circular pattern from corresponding A-scan lines along said cycle of said circular pattern, wherein said processing further comprises forming a pseudo C-scan representation from a plurality of pseudo B-scans for corresponding successive pluralities of cycles of said circular pattern, and wherein said processing further comprises averaging said pseudo C-scan representation along an axial direction for each A-scan within said pseudo C-scan representation to provide a two-dimensional transverse motion tracking map.

14. The method of claim 13, wherein said processing further comprises identifying linear patterns in said two-dimensional transverse motion tracking map in order to determine said both magnitude and direction of relative motion of said OCT system.

15. The method of claim 14, wherein said processing further comprises performing a two-dimensional spatial Fourier transform of said two-dimensional transverse motion tracking map in order to determine said both magnitude and direction of relative motion of said OCT system.

16. The method of claim 15, wherein said processing further comprises performing a two-dimensional spatial Fourier transform of said two-dimensional transverse motion tracking map to provide a transform map in order to determine said both magnitude and direction of relative motion of said OCT system.

17. The method of claim 16, wherein said processing further comprises performing a threshold filtering of said transform map to provide a binary map in order to determine said both magnitude and direction of relative motion of said OCT system.

18. The method of claim 17, wherein said processing further comprises performing a Hough transformation of said binary map to determine linear features in said binary map in order to determine said both magnitude and direction of relative motion of said OCT system.

* * * * *